United States Patent [19]
Lowdenslager

[11] 3,789,308
[45] Jan. 29, 1974

[54] DIGITAL PHASE LOCKED LOOP

[75] Inventor: John R. Lowdenslager, Chappaqua, N.Y.

[73] Assignee: The Singer Company, New York, N.Y.

[22] Filed: Dec. 13, 1972

[21] Appl. No.: 314,607

Related U.S. Application Data
[62] Division of Ser. No. 94,263, Dec. 2, 1970, Pat. No. 3,729,674.

[52] U.S. Cl.................. 328/155, 328/63, 328/109, 328/127, 328/48, 328/140
[51] Int. Cl. ............................................... H03b 3/04
[58] Field of Search ....... 328/48, 155, 140, 127, 63, 328/109

[56] References Cited
UNITED STATES PATENTS 3,458,823  7/1969  Nordahl............................ 328/155
3,546,603  12/1970  Lenz................................... 328/155
3,550,015  12/1970  Naubereit et al..................... 328/48

*Primary Examiner*—John S. Heyman
*Attorney, Agent, or Firm*—Thomas W. Kennedy

[57] ABSTRACT

A digital phase locked loop is provided for an input signal at a frequency $f_s$. An n-stage counter is driven with a $2^n \times f_s$ coherent source. The input signal and the output of the $n$-stage counter are coupled to a phase detector which samples the phase of the input signal. The detected signal is periodically integrated. The integrated signal is coupled to an analog to digital converter whose output controls a pulse advance or retard means which is serially coupled between the coherent source and the counter.

4 Claims, 3 Drawing Figures

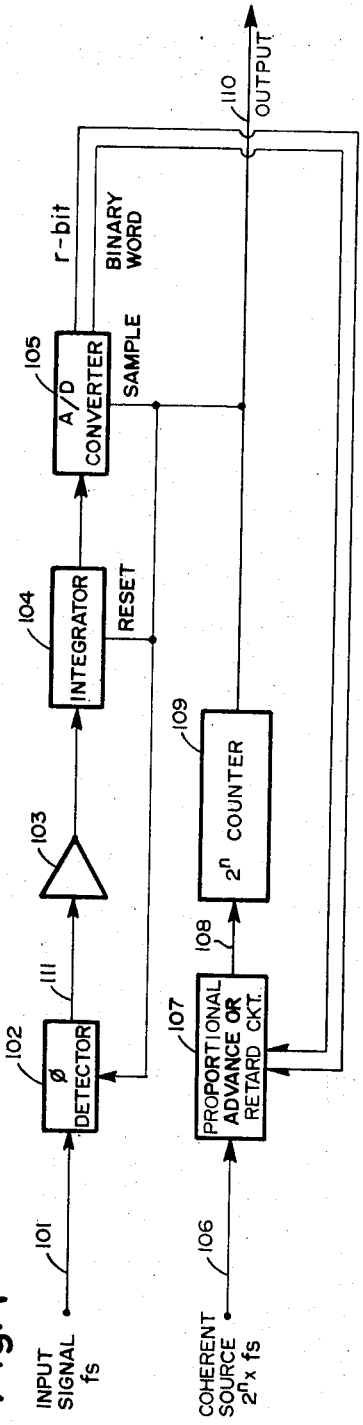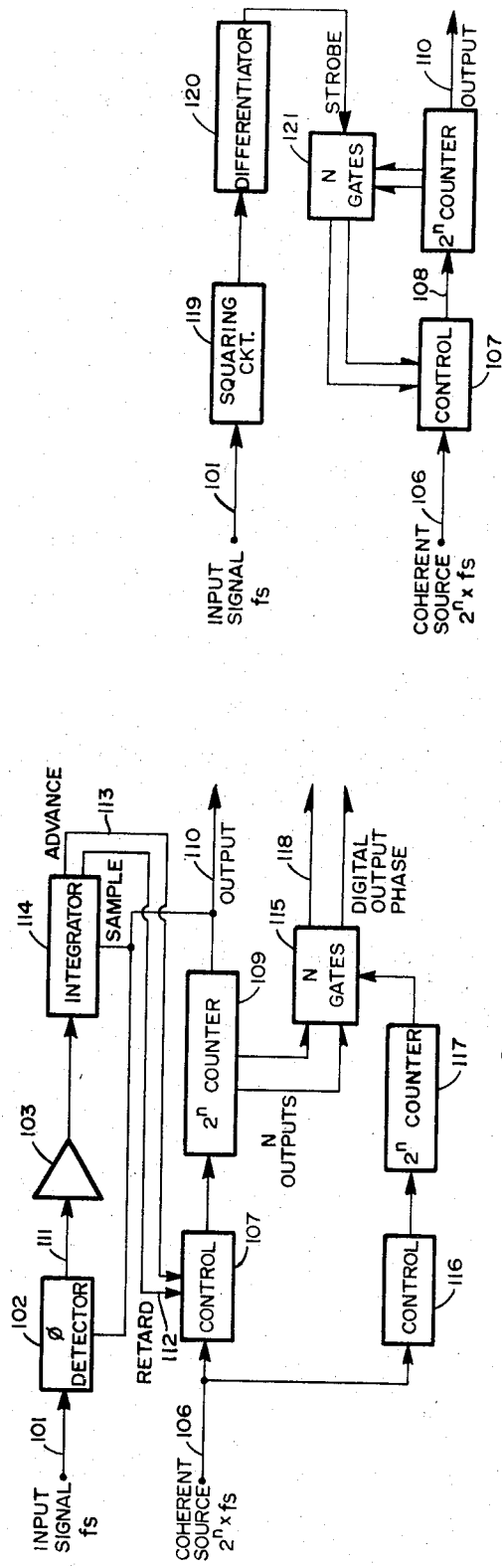

DIGITAL PHASE LOCKED LOOP

This is a division of application Ser. No. 94,263, filed Dec. 2, 1970, and which has subsequently issued as U.S. Pat. No. 3,729,674.

BACKGROUND OF THE INVENTION

1. Field of the Invention

This invention relates to digital phase locked loops.

2. Description of the Prior Art

Prior art gyroscopic devices, generally, use mechanical components, such as mechanical resolvers, mechanical servo loops, and the like. Gyroscopes in general, are of the mechanical design.

Various U.S. Patents relating to the field of nuclear gyroscopes and direction sensors, pertinent to the subject matter at hand, and assigned either directly or by mesne assignment to the assignee of this present invention, are as follows:

U.S. Pat. No 3,103,620, Fraser, Sept. 10, 1963; U.S. Pat. No. 3,103,621, Fraser, Sept. 10, 1963; U.S. Pat. No. 3,103,623, Greenwood Jr. Sept. 10, 1963; U.S. Pat. No. 3,103,624, Greenwood Jr. et al. Sept. 10, 1963; U.S. Pat. No. 3,491,286, Simpson, Jan. 20, 1970; U.S. Pat. No. 3,524,127, Conklin, et al. Aug. 11, 1970.

Fraser, in his '621 patent, describes an optically pumped magnetic resonance direction sensor, wherein two substantially equal and opposite unidirectional magnetic fields spaced from each other and parallel to the common axis are provided. A container encloses two dissimilar substances, each exhibiting magnetic resonance when properly excited, located in one of the fields and a second identical container located in a second unidirectional field. The containers are irradiated with energy at the resonance frequency of at least one of the substances in the containers. Associated with each unidirectional field is an alternating magnetic field which has a frequency equal to the Larmor frequency of each substance to cause forced precession of the magnetic moments of the substance about the axis of the unidirectional fields. The precessional frequencies of the magnetic moments of the substances are detected and read out. The phase of the signals corresponding to the precessional frequency of similar substances in the two fields are compared and signals are provided for indicating the magnitude and direction of any phase shift.

Greenwood ('623) provides an arrangement by which suitable instrumentation is coupled to two or more aggregations or samples of nuclei so as to discern changes in the inertial frame orientation relative to inertial space.

This is achieved by employing two magnetic gaps having unidirectional magnetic fields, parallel but oppositely directed, to each other. Magnetic gaps are formed in a magnetic structure rigidly associated with the remainder of the apparatus. A nuclear sample is positioned in each field, each of the samples containing the same kind of nuclei. Four nuclear magnetic resonance signals are derived from excited nuclei. By phase comparison methods, one pair of signals is fed back to control the magnetic field strength so as to eliminate any requirement for any independent knowledge of the absolute field magnitude. From the other pair of the four signals, there is derived a signal representing the integral of the rate of rotation of the apparatus about one of its magnetic field directions. This rate of rotation is relative to inertial space. Forced precession and free precession methods may be used to excite the nuclei and derive the nuclear magnetic resonance signals therefrom. The F. Bloch induction method, described in U.S. Pat. No. Re23,950, associated with the Hershberger regenerative feedback circuit which eliminates need for external oscillators to excite the nuclei, as described in U. S. Pat. No. 2,589,494 may be employed and may be termed a spin generator.

Greenwood ('624) derives an output signal from two nuclear magnetic resonance signals, phases rather than frequencies being compared because of the extreme accuracy required. An error signal is derived from one of the nuclear magnetic resonance signals and is made to control either the unidirectional magnetic field strength of the alternating magnetic field frequency. From the other nuclear magnetic resonance signal, a phase difference signal is derived which is employed in securing the desired output quantity.

As Conklin ('127) suggests, before describing the invention in detail, it might be helpful to briefly consider some fundamental aspects of nuclear magnetic resonance theory. The following explanation is confined only to those concepts which are necessary for a proper understanding of this invention. If the reader is interested in the more extensive treatment on the subject of magnetic resonance he is directed to the above cited patent Bloch et al. or to standard texts on atomic theory. In accordance with the principles of quantum mechanics, it is known that certain nuclei possess a magnetic moment due to nuclear angular momentum or spin. The dual properties of magnetic moment and angular momentum behave as parallel vectors and are related to each other by the proportionality $\gamma$ referred to as the gyromagnetic ratio. The ratio is given by $2\pi\mu/Ih$ Where $\mu$ is the maximum measurable component of the magnetic moment, $I$ is the nuclear spin member and $h$ is Planck's constant.

The reader is further directed to the patent of Conklin '127 for additional background explanation.

One form of prior art apparatus for tracking the phase of an input signal includes a mechanical resolver which is positioned by exciting several phase windings of its stator with alternating current. The rotor of the resolver is positioned by a phase detector and servo motor and amplifier. Disadvantageously, such apparatus is expensive, has moving parts, and requires complicated multiphase excitation; the duty cycle of its output signal is not precise.

Another form of prior art phase tracking apparatus includes a voltage controlled oscillator driven by a phase detector and a dc amplifier in a loop. Disadvantageously, the voltage controlled oscillator in a phase locked loop must first be positioned close to the input frequency before it will acquire. That is, it requires an acquisition mode. It is difficult to control the frequency output characteristic of an oscillator as a function of input voltage. Therefore, any drift must be countered by a corresponding phase error. Once the loop is acquired, the short term stability of the oscillator causes fluctuation. The output is not a precise 50 percent duty cycle.

Still another form of prior art apparatus for phase tracking includes a voltage controlled delay in a loop using an integrator and a phase detector. Disadvantageously, the voltage control delay device suffers from the fact that less than 360° of delay is normally obtainable with a single unit, so that two should be used in tandom to provide the desired delay. At least three units are required for an accurate 50 percent duty cycle at the output. The delay operation must be conducted at twice the frequency and then divided down. The device is also subject to saturation when the phase rotates over one cycle.

The Spin Generator

A crystal oscillator depends, frequency and phase, on mechanical excitation and characteristics of the crystal.

A spin generator is an oscillator which is in many respects, similar to a crystal oscillator, except that it is a nuclear magnetic resonance device which depends on precession of a magnetic moment about a dc magnetic field in space, and is direction sensitive.

In general, nuclear generators may be said to depend for its operation on the property of rigidity in space, similar to that of a free gyroscope. However, unlike the free gyroscope, they have little or no drift or accumulated error in its direction indications, this virtue being obtained by basing the operation on the properties of sub-atomic particles.

The spin generator includes, basically, a feedback amplifier, which has in its feedback loop a frequency sensitive device, such as an aggregate of nuclei. As an example, odd numbered isotopes of mercury may be used. A spin generator can be provided with just one isotope. It is odd numbered so that the charges are not matched, so that an extra charge is provided in the nucleus. Hence, in a spin generator, the nucleus contains an odd number of protons. Otherwise, if the protons were even numbered, they would be matched back to back; they spin and any generated magnetic field would be cancelled out.

The charged nucleus rotates. Because it rotates, it obeys a right hand rule, which says if you put your fingers in the direction that it is rotating, your thumb indicates the direction of the magnetic field. This spinning nucleus can be thought of as a magnetic dipole in space. Because every nucleus has a mass, and a mechanical axis, it can be thought of, also, as a mechanical element which obeys the laws that are established for any gyroscope. That is, its axis of rotation will move in a circle or precess if a torque be applied to it outside of the plane of its rotation.

A sample of numerous nuclei are placed within a small magnetic field. The nuclei will align themselves to the magnetic field because each nucleus is a magnetic dipole. If the field were to be suddenly changed so that it is at right angles to the direction in which all the nuclei were aligned, then a torque will be applied. If the externally applied magnetic field rotated suddenly at 90°, all the nuclei will tend to be pulled up into the new magnetic field. When this occurs, they precess, because they are also gyroscopes. The precessing nuclei effectively act as a precessing magnetic field which will describe in space a rotating frequency. This precessional frequency is proportional to the applied magnetic field. The constant of proportionality is called the gyro-magnetic or magneto gyric ratio which is represented by $\gamma$. This rotation takes place in free inertial space.

The nuclei precess in space, creating an electric field that can be picked up by a magnetic coil. Similarly, the nuclei can be acted upon by a magnetic coil. With the magnetic coil, the frequency can be sensed and measured. If an observer, or observer coil, is rotating in the same direction as the precession, an apparent frequency is obtained which will be lower and if the observer is rotating in the opposite direction, the apparent frequency will be higher. The frequency at which the nuclei spins is fixed and known. When an observer's platform is spinning around the same axis, a different frequency would be observed. By integrating this frequency, a phase angle is obtained which is proportional to the angle through which the device has rotated. To that extent, it is a gyroscope. The problem, then, is to measure the phase shift. This measurement can be obtained by simply changing the magnetic field, and by measuring the precessing electric vector. By exciting the nuclei with an ac field, the vector (which is a summation of many tiny vectors for the many nuclei) precesses and will either be leading, lagging, or in phase depending as the frequency of the excitation is equal to, greater than, or less than this precessional frequency. In other words, by applying a rotating magnetic field, the nuclei will tend to follow the field, just like a synchronous motor, and depending as the frequency is higher or lower than the motor spins, the applied field will be either in or out of phase, leading or lagging the signal. For example, a nuclear spin generator can be constructed by using mercury pumped with ultraviolet light. The mercury vapor is pumped with the same wavelength of light that the mercury isotope gives off, such as 2,537 Angstrom ultraviolet light. The mercury nuclei are excited in the similar manner as pumping excites a laser. At the same time, an ac magnetic field is applied with coils to the sample. Advantageously, one of the properties of mercury is that the rotation of the precessing vector intensity modulates the pumping beam going though it, so that an optical readout can be obtained.

Thus, one form of a spin generator has a read-in and a read-out, and it has a transfer characteristic: magnetic in and optical out. The output modulation component is read out on a light beam which is detected by a photomultiplier tube which is coupled to the input of an amplifier, the output of the amplifier going back to the magnetic excitation.

SUMMARY OF THE INVENTION

An object of this invention is to provide for new and improved digital phase locked loops which may be used for monitoring the phase shift due to nuclei precessing in a magnetic field.

Still another object of this invention is to provide for a novel digital phase locked loop which is solid state in construction and has no mechanical moving parts.

Yet another object of this invention is to provide for a novel digital phase locked loop which is highly stable, can be rotated indefinitely in one direction over extremely large numbers of cycles without saturation, and when an input signal is removed, remains locked in phase.

Another object of this invention is to provide for a new and improved digital phase locked loop which is inexpensive compared to corresponding devices of the prior art.

In accordance with other features of the invention, a crystal oscillator having a resonance frequency $2^n f_1$ and a second frequency source which may be spin generator as described above having particles which are caused to precess at a nominal frequency $f_1$ can be phase locked together in synchronism. The precessional frequency of the particles of the spin generator are detected, coupled to a filter at the frequency $f_1$, and pulse shaping means to provide strobing pulses at the nominal frequency $f_1$ in synchronism with the spin generator. A frequency dividing circuit coupled to the crystal oscillator provides a binary output along a plurality of lines therefrom at cyclic rate $f_1$. A multi-stage flip flop register has input terminals coupled to the frequency dividing circuit, and has a strobing terminal coupled to receive the strobing pulses for gating signals from the dividing circuit into the register. The output of the multi-stage flip flop register controls the spin generator unidirectional field, completing the loop, to thereby phase lock the nominal frequency of the spin generator in synchronism with the crystal oscillator. In accordance with certain features of the invention, apparatus is described which provides a square wave output signal at substantially a repetition rate $f_s$, having a phase closely approximating the phase of an input signal at the corresponding frequency rate. In one embodiment, such an apparatus includes a source of signals having a frequency rate of $2^n \times f_s$ and an n stage binary counter. The counter provides a square wave output signal therefrom at a frequency rate of $1/2^n$ that of a signal applied to the input thereof. A phase detector receives both the input signal and the output of the binary counter to provide a signal representative of the phase difference between its inputs. The phase detector output is coupled to an integrator means which is reset periodically by the counter. An analog to digital converter is coupled to the integrating means for producing a digital output therefrom corresponding to the integrated phase representative signal applied thereto. Control means, which couples the source of signal to the counter, advances and retards the phase of the square wave output signal proportional to the digital output.

In accordance with further features of the invention, such apparatus for providing a square wave output signal at substantially a repetition rate $f_s$, having a phase closely approximating the phase of an input signal at the frequency rate $f_s$, includes, as before, a source of signals having a frequency rate of $2^n \times f_s$ and an $n$ stage binary counter. The counter provides a square wave output signal therefrom at a frequency rate of $1/2^n$ that of a signal applied to the input thereof. A phase detector receives both the input signal and the output from the binary counter for providing a signal therefrom representative of the phase of the input signal. A level discriminator, coupled to the output of the phase detector provides an "advance" signal along one output line therefrom and a "retard" signal along a second output line therefrom in a selective fashion. Control means, coupling the source of signals to the counter, advances and retards the phase of the square wave output signal proportional to the output from the level discriminator. In accordance with specific features of the invention, the $n$ stage binary counter further includes $n$ outputs therefrom for carrying data indicative of the instantaneous state of the counter. A second $n$ stage binary counter and means for coupling the source of signals through the second counter operate, in combination, to provide a reference phase. A digital output for representing the difference between the phase of the input signal and the reference phase is provided by circuitry including n two-input AND gates, one input of each of the gates being coupled to a corresponding one of the $n$ outputs of the first binary counter, the second input of each of the gates being coupled to the output of the second counter, so that the $n$ outputs thereof indicate the digital output phase difference.

In accordance with still other features of this invention, apparatus is described which provides a square wave output signal at substantially a repetition rate $f_s$ having a phase closely approximating the phase of an input signal at the frequency rate $f_s$. Such apparatus includes a source of signals having a frequency rate $2^n \times f_s$. An n stage binary counter provides a square wave output signal therefrom at a frequency rate $1/2^n$ that of a signal applied to the input thereof, and n outputs therefrom for carrying data indicative of the instantaneous state of the counter. The input signal is converted into a train of pulses having a repetition rate of $f_s$. N two-input AND gates are provided, wherein one input of each of the gates is coupled to a corresponding one of the $n$ outputs from the counter. The second inputs of the gates are coupled to receive the train of pulses. Control means, coupling the source of signals to the counter, advances and retards the phase of the square wave signal in accordance with the states of the AND gates. The carry of the counter, occurring when the counter fills and resets to zero, coincides with the pulse of the train so that the output waveform of the counter tracks the input signal phase.

DESCRIPTION OF THE DRAWINGS

FIG. 1 is a functional block diagram of one embodiment of the subject invention.

FIG. 2 is a functional, block diagram of another embodiment of the subject invention.

FIG. 3 is a functional, block diagram of still another embodiment of the subject invention.

DESCRIPTION OF A PREFERRED EMBODIMENT

Referring to FIG. 1, an input signal at a frequency $f_s$, in which it is desired to track and measure the phase, is applied on the line 101. This input signal $f_s$ enters a phase detector 102, the output of which is amplified by an amplifier 103, and then is integrated by a resetable integrator 104. The output of the integrator 104 is coupled to an analog to digital converter 105 whose output, an r-bit binary signal, enters a control device 107 which advances or retards the phase of the output signal on a line 110 proportional to the measured phase error. A clock signal with a frequency of $2^n \times f_s$ on a line 106, coming from a source which is coherent with or very nearly coherent with the input signal $f_s$, is processed by the control circuit 107 to provide a driving signal on a line 108 for an $n$-stage binary counter 109. The clock signal gets divided by the $2^n$ counter 109 and provides an output square wave on the line 110 which provides a reference for the phase detector 102, a reset command for the integrator 104, and a sample command for the analog to digital converter 105.

In an alternate construction as shown in FIG. 2, wherein corresponding reference numerals indicate corresponding parts as shown in FIG. 1, a level descriminator 114 is utilized in lieu of an analog to digital converter to provide simple advance and retard signals 112, 113 to the control 107. A digital output phase on lines 118 is also shown. A reference wave form, coming from another $2^n$ counter 117, driven by a control 116, strobes n gates 115 to which are provided the n outputs of the $2^n$ counter 109 to provide an n-bit parallel digital output phase angle on the lines 118.

In operation, the circuits of FIGS. 1 and 2 function as follows: The input signal on the line 101 is detected by the phase detector 102. The phase error signal is amplified by the dc amplifier 103 and enters the integrator 104 (FIG. 1). This signal is integrated only over one cycle of the output signal and the integrator 104 is sampled by the analog to digital converter 105 and reset. The analog to digital converter 105 may be simply constructed depending upon the nature of the input signal and the requirement for averaging it. FIG. 2 illustrates the limit where the level discriminator 114 is considered an analog to digital converter recognizing only two values of the input signal.

The r-bit binary phase error number, as shown in FIG. 1, can be transmitted in parallel or in series to the control device 107. The function of the control device 107 is to supply clocked pulses on the line 108 to the $2^n$ counter 109. When the input phase is fixed and the frequency of the clock is exactly $2^n \times f_s$, the phase of the output of the $2^n$ counter 109 remains fixed with respect to the input signal. Note, that for perfect tracking, the clock source should be exactly coherent, that is, the input signal and the signal source at $2^n \times f_s$ should be derived from the same oscillator or from phase locked oscillators. By occasionally inhibiting individual clock pulses in the signal that drives the $2^n$ counter 109, the phase of the output can be retarded with respect to the phase of the input signal in steps of $360°/2^n$. Thus, if n equals 10, the incremental steps are about 0.351°.

Similarly, by including occasional extra clock pulses in a signal that drives the $2^n$ counter 109, the phase of the output can be advanced with respect to the input signal.

Thus, when the error measured by the phase detector is x units in the r-bit error code coming from the a-d converter 105, the control unit 107 retards or advances the $2^n$ counter 109 by inhibiting or supplying extra x pulses. Typically, the amount of correction that occurs deviates slightly from the measured error so that a degree of averaging is provided.

By using the level discriminator 114, as shown in FIG. 2, the control 107 simply adds one extra pulse or inhibits one pulse.

A digital output can be provided by comparing the number in the $2^n$ counter 109 with another signal at the frequency $f_s$ as a phase reference. FIG. 2 indicates one such application where a second control 116 and another $2^n$ counter 117 represent either a coherent phase reference or another phase lock process such as a calibrating phase. The phase difference between the output of the counter 117 and the counter 109 is numerically equal (in counter units) to the instantaneous difference between the numbers stored in the counters 109, 117. These numbers are changing very rapidly, requiring an efficient manner for extracting the phase difference: The output of the counter 117 is used to strobe the output of the counter 109; everytime the counter 117 passes through the binary $2^n$ value and resets to zero, the gates 115 are opened, the number strobed out from the gates represents the phase difference.

Therefore, the digital output gives the difference between the input signal phase and the reference phase, once every cycle of the input signal.

Another form of the invention is illustrated in FIG. 4, where an input signal is relatively clean and free from noise. The input signal 101 is squared in a limiter or a clipper and an amplifier 119, and either the leading or the trailing edge is differentiated in a differentiator 120. The resulting pulse is used to strobe n gates 121 which samples the number in the counter 109, transferring an error signal to the control unit 107 which either advances or retards the phase of the $2^n$ counter, so that the carry of the counter (which occurs when the number in the counter reaches $2^n$ binary and resets to zero) is made to coincide with the strobe pulse, and thus the output waveform of the $2^n$ counter 109 is made to track the input signal phase.

Thus, the phase locked loops of FIGS. 1, 2, and 3 operate as perfect integrators: the output waveforms have a precise 50 percent duty cycle. The digital output is immediately available once every cycle of the output of oftener, if desired.

Advantageously, with the phase lock circuits of FIGS. 1, 2, and 3, a binary counter is used as a phase integrator in a phase locked loop. The phase of the counter output is precisely controlled by insertion of extra clock pulses to advance the phase, or by inhibition of clock pulses to retard the phase. The output of the phase loop is provided digitally by strobing the integrator.

The proportional advance or retard control device 107 of FIGS. 1, 2, 3 simply advances or retards the phase of the signal applied to it. Circuitry similar to the circuit 29 can be used as the control device 107.

The coherent source operates at $2^n \times f_s$. The value of n can represent any positive integer. However, when n=1, then only two possible phases occur: 0° and 180° out of phase. When n=2, then four possible phases occur: 0°, 90°, 180°, and 270°. When n=3 eight possible phases occur: 0°, 45°, 90°, 135°, etc. The value of n is dependent upon what kind of phase resolution is desired. When n=1, phase resolution to approximately that of milliradian is obtainable. When n=5, phase resolutions of about 11.25 are obtainable. In other words, resolutions are obtained with a resolution of $360°/2^n$.

It will be apparent that various modifications may be performed without departing from the spirit and scope of this invention. For example, digital phase locked loop circuitry can be used in systems other than nuclear gyroscopic instrumentation.

I claim:

1. Apparatus for providing a square wave output signal at substantially a repetition rate $f_s$ having a phase closely approximately the phase of an input signal at the frequency rate $f_s$, said apparatus comprising
    a. means for receiving the input signal having a frequency $f_s$;
    b. a source of signals having a frequency rate at $2^n \times f_s$, wherein n is a positive integer;
    c. an n-stage binary counter having an input and an output, and being adapted to provide a square wave output signal therefrom at a frequency rate $1/2^n$ that of a signal applied to the input thereof;
    d. a phase detector circuit coupled to receive said input signal receiving means and the output of the said binary counter for providing a signal therefrom representative of the phase of said input signal;

e. integrating means coupled to the output of said phase detector circuit for integrating the representative signal therefrom, said integrating means being reset periodically by the output signal from said counter;

f. an analog to digital converter coupled to said integrating means for producing a digital output therefrom corresponding to the integrated phase representative signal applied thereto; and g. control means, coupling said source of signals to said counter, for advancing and retarding the phase of said square wave output signal proportional to said digital output.

2. Apparatus for providing a square wave output signal at substantially a repetition rate $f_s$ having a phase closely approximating the phase of an input signal at the frequency rate $f_s$, said apparatus comprising a. means for receiving the input signal having a frequency $f_s$;

b. a source of signal having a frequency rate at $2^n \times f_s$, wherein n is a positive integer;

c. an $n$-stage binary counter having an input, and a first output adapted to provide a square wave output signal therefrom at a frequency rate $1/2^n$ that of a signal applied to the input thereof;

d. a phase detector circuit coupled to receive said input signal receiving means and the output of said binary counter for providing a signal therefrom representative of the phase of said input signal;

e. level discriminator means coupled to the output of said phase detector circuit for providing an "advance" pulse along one output line therefrom, and a "retard" pulse along a second output line thereon, in a selective manner; and f. control means, coupling said source of signals to said counter, for advancing and retarding the phase of said square wave output signal proportional to said level discriminator outputs.

3. The apparatus as recited in claim 2 wherein said $n$-stage binary counter further includes $n$ outputs therefrom for carrying data indicative of the instantaneous state of said counter; said apparatus further comprising A. means for providing a reference phase including 1. a second $n$-stage binary counter, and
2. means for coupling said source of signals through said second counter; and B. means for providing a digital output for representing the difference between the phase of said input signal and said reference phase including 1. $n$ two-input AND gates, one input of each of said gates being coupled to a corresponding one of the $n$ outputs of the first binary counter, the second input of each of said gates being coupled to the output of said second counter, and $n$ outputs therefrom for indicating the digital output phase difference.

4. Apparatus for providing a square wave output signal at substantially a repetition rate $f_s$ having a phase closely approximating the phase of an input signal at the frequency rate $f_s$, said apparatus comprising a. means for receiving the input signal having a frequency $f_s$;

b. a source of signal having a frequency rate at $2^n \times f_s$; wherein $n$ is a positive integer;

c. an $n$-stage binary counter having an input, a first output adapted to provide a square wave output signal therefrom at a frequency rate $1/2^n$ that of a signal applied to the input thereof; and $n$ outputs therefrom for carrying data indicative of the instantaneous state of said counter;

d. means for converting the input signal into a train of pulses having a repetition rate $f_s$;

e. $n$ two-input AND gates, one input of each of said gates being coupled to a corresponding one of the $n$ outputs from said counter, the second input of said gates being coupled to receive said train of pulses; and f. control means, coupling said source of signals to said counter, for advancing and retarding the phase of said square wave signal in accordance with the states of said AND gates, whereby the carry of said counter—which occurs when the counter reaches $2^n$ and resets to 0—is made to coincide with a pulse of said train, so that the output waveform of said counter tracks the input signal phase.

* * * * *